US012649377B2

(12) United States Patent
Watanabe

(10) Patent No.: US 12,649,377 B2
(45) Date of Patent: Jun. 9, 2026

(54) ELECTRIFIED VEHICLE HAVING CONTROL DEVICE THAT PERFORMS OFFSET LEARNING PROCESS

(71) Applicant: TOYOTA JIDOSHA KABUSHIKI KAISHA, Toyota (JP)

(72) Inventor: Yu Watanabe, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 104 days.

(21) Appl. No.: 18/773,962

(22) Filed: Jul. 16, 2024

(65) Prior Publication Data

US 2025/0145032 A1     May 8, 2025

(30) Foreign Application Priority Data

Nov. 7, 2023     (JP) .................................. 2023-189929

(51) Int. Cl.
*B60L 53/16*          (2019.01)
(52) U.S. Cl.
CPC .................................... *B60L 53/16* (2019.02)

(58) Field of Classification Search
CPC ............................. B60L 53/16; B60L 2260/46
See application file for complete search history.

(56) References Cited

U.S. PATENT DOCUMENTS

| | | | |
|---|---|---|---|
| 2017/0274894 A1* | 9/2017 | Sato ...................... | B60K 6/365 |
| 2021/0245610 A1 | 8/2021 | Ando et al. | |
| 2023/0241989 A1* | 8/2023 | Ando ...................... | B60L 53/16 |
| | | | 320/104 |
| 2025/0236178 A1* | 7/2025 | Kinomura ............... | B60L 55/00 |

FOREIGN PATENT DOCUMENTS

JP          2021-126009 A       8/2021

* cited by examiner

*Primary Examiner* — Michael C Zarroli
(74) *Attorney, Agent, or Firm* — SoraIP, Inc.

(57)          ABSTRACT

ECU performs a process including: a step of determining whether or not the current value of the value indicating the state of the lid is a value indicating the open state; a step of determining whether or not the previous value of the value indicating the state of the lid is a value indicating the closed state; a step of performing an offset learning process if the current value is a value indicating the closed state; and a step of using the current value as the value of the previous value.

4 Claims, 6 Drawing Sheets

ELECTRIFIED VEHICLE HAVING CONTROL DEVICE THAT PERFORMS OFFSET LEARNING PROCESS

CROSS-REFERENCE TO RELATED APPLICATION

This application claims priority to Japanese Patent Application No. 2023-189929 filed on Nov. 7, 2023, incorporated herein by reference in its entirety.

BACKGROUND

1. Technical Field

The present disclosure relates to electrified vehicles.

2. Description of Related Art

In electrified vehicles using a motor as a driving source, such as battery electric vehicles and plug-in hybrid electric vehicles, an in-vehicle energy storage device that supplies electric power to the driving source is charged using an external power supply (hereinafter, such charging will be referred to as external charging). For example, the external charging is performed by attaching (connecting) a connector connected to the external power supply to an inlet of an electrified vehicle. It is therefore required to accurately determine whether the connector is attached to the inlet.

Japanese Unexamined Patent Application Publication No. 2021-126009 (JP 2021-126009 A) discloses a technique of determining the type of connector and whether the connector is attached to an inlet based on the potential of a signal applied via the inlet when the connector is attached to the inlet.

SUMMARY

In the case where whether the connector is attached to the inlet is determined based on the potential of the signal applied via the inlet as described above, a predetermined range that is a possible range of the potential and a threshold within the predetermined range are set. On the other hand, in consideration of compatibility between the vehicle and the connector, certain errors such as an error in resistance of an internal circuit and a detection error on the vehicle side need to be allowed. However, if the possible range of the potential exceeds the predetermined range due to such allowed errors, it may not be possible to set the threshold for determining whether the inlet is attached to the connector.

The present disclosure was made to solve the above issue, and an object of the present disclosure is to provide an electrified vehicle that accurately determines whether a connector is attached to an inlet.

An electrified vehicle according to an aspect of the present disclosure includes:

- an inlet covered by a lid and having such a shape that a connector of external equipment is attachable to the inlet;
- a first detection circuit that detects an open or closed state of the lid;
- a second detection circuit that outputs a voltage indicating whether the connector is attached to the inlet; and
- a control device that performs an offset learning process when the connector is not attached to the inlet, the offset learning process being a process of calculating a correction value using a difference between the voltage output from the second detection circuit and a predetermined voltage.

The control device performs the offset learning process using a detection result from the first detection circuit.

With this configuration, it can be reliably determined based on the state of the lid of the inlet that the connector is not plugged in the inlet. This allows offset learning of the unplugged voltage to be performed at an appropriate timing (when the connector is not plugged in the inlet and is just about to be plugged in the inlet).

In one embodiment, the control device may perform the offset learning process when the lid changes from the closed state to the open state based on the detection result.

The moment when the lid changes from the closed state to the open state is highly likely to be when the connector is not yet plugged in and is just about to be plugged in. It is therefore possible to determine that this is the right timing to perform the offset learning.

In another embodiment, when the lid changes from the closed state to the open state, the control device may perform the offset learning process using a most recent detection result from the second detection circuit before the lid changes to the open state.

The possibility that the connector is plugged in at the moment the lid changes from the closed state to the open state is not zero. Therefore, in this configuration, the offset learning is performed using a plug-in signal voltage when the lid is in the closed state rather than a plug-in signal voltage at the moment the lid is opened. This allows the offset learning to be performed using the plug-in signal voltage before the connector is plugged in.

In still another embodiment, the electrified vehicle may further include a lock mechanism that is controlled by the control device to allow the connector to be locked in the inlet. The control device may perform the offset learning process when the lid is in the closed state and the lock mechanism is switched from a lock state to an unlock state.

It is almost certain that the connector is not plugged in when the lid is in the closed state. With the above configuration, when the lid is unlocked, it means that it is highly likely that the lid will be opened and the connector will be plugged in. It is therefore possible to determine that this is the right timing to perform the offset learning.

An electrified vehicle according to another aspect of the present disclosure includes:

- an inlet having such a shape that a connector of external equipment is attachable to the inlet;
- a first detection circuit that detects a speed of the vehicle;
- a second detection circuit that outputs a voltage indicating whether the connector is attached to the inlet; and
- a control device that performs an offset learning process when the connector is not attached to the inlet, the offset learning process being a process of calculating a correction value using a difference between the voltage output from the second detection circuit and a predetermined voltage.

The control device performs the offset learning process when determination is made that the speed of the vehicle is equal to or greater than a threshold.

In this configuration, when the vehicle speed is equal to or greater than a certain value, it means that the vehicle is moving and it is certain that the connector is not plugged in. It is therefore possible to determine that this is the right timing to perform the offset learning.

The present disclosure can provide an electrified vehicle that accurately determines whether a connector is attached to an inlet.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram illustrating an example of a configuration of a vehicle;

DETAILED DESCRIPTION OF EMBODIMENTS

Figure 2:
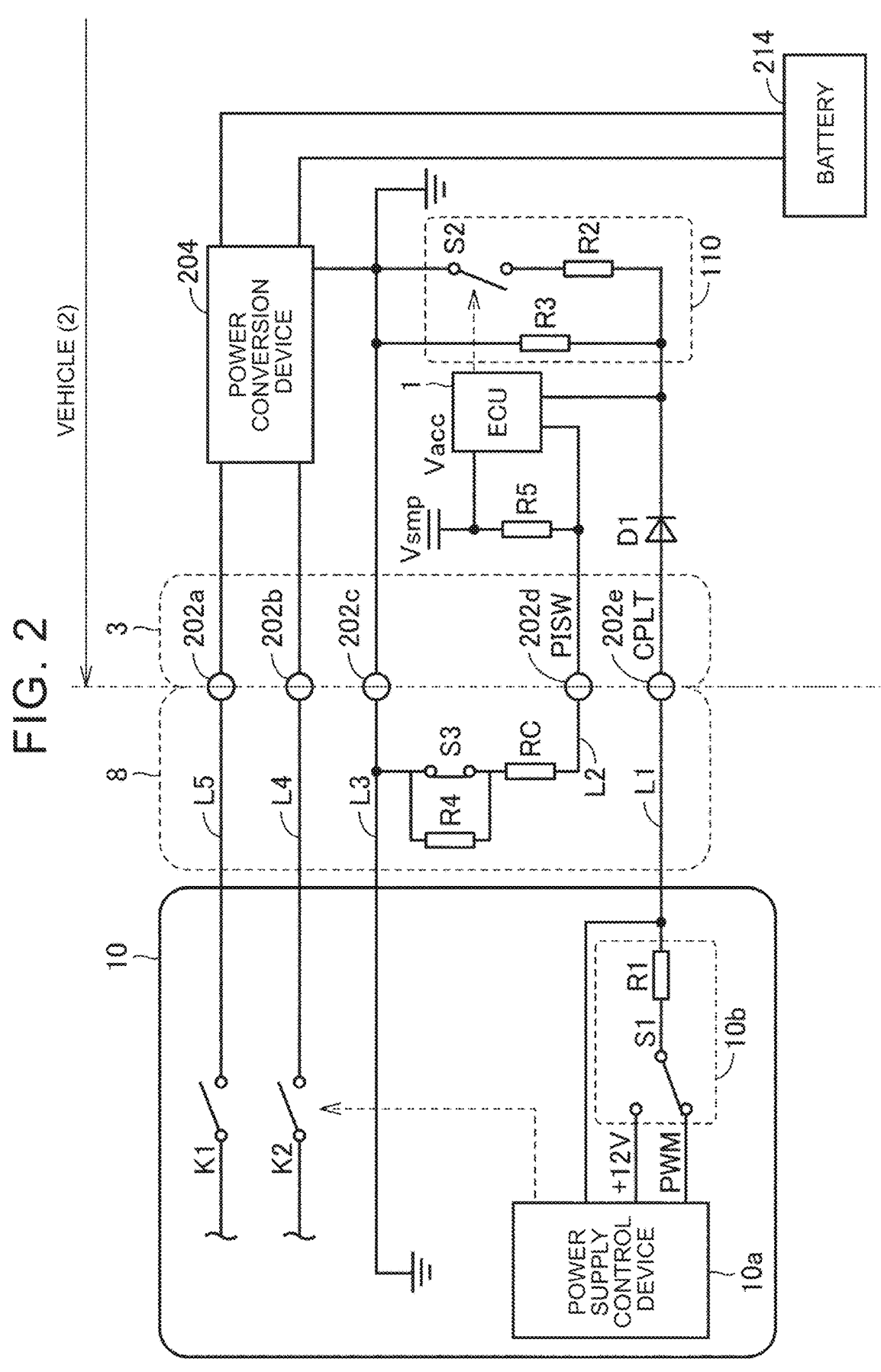
FIG. 2 is a diagram illustrating an example of a circuit configuration in power supply equipment and a vehicle.

Hereinafter, an embodiment of the present disclosure will be described in detail with reference to the drawings. It should be noted that the same or corresponding parts in the drawings are designated by the same reference characters and repetitive description will be omitted.

Figure 1:
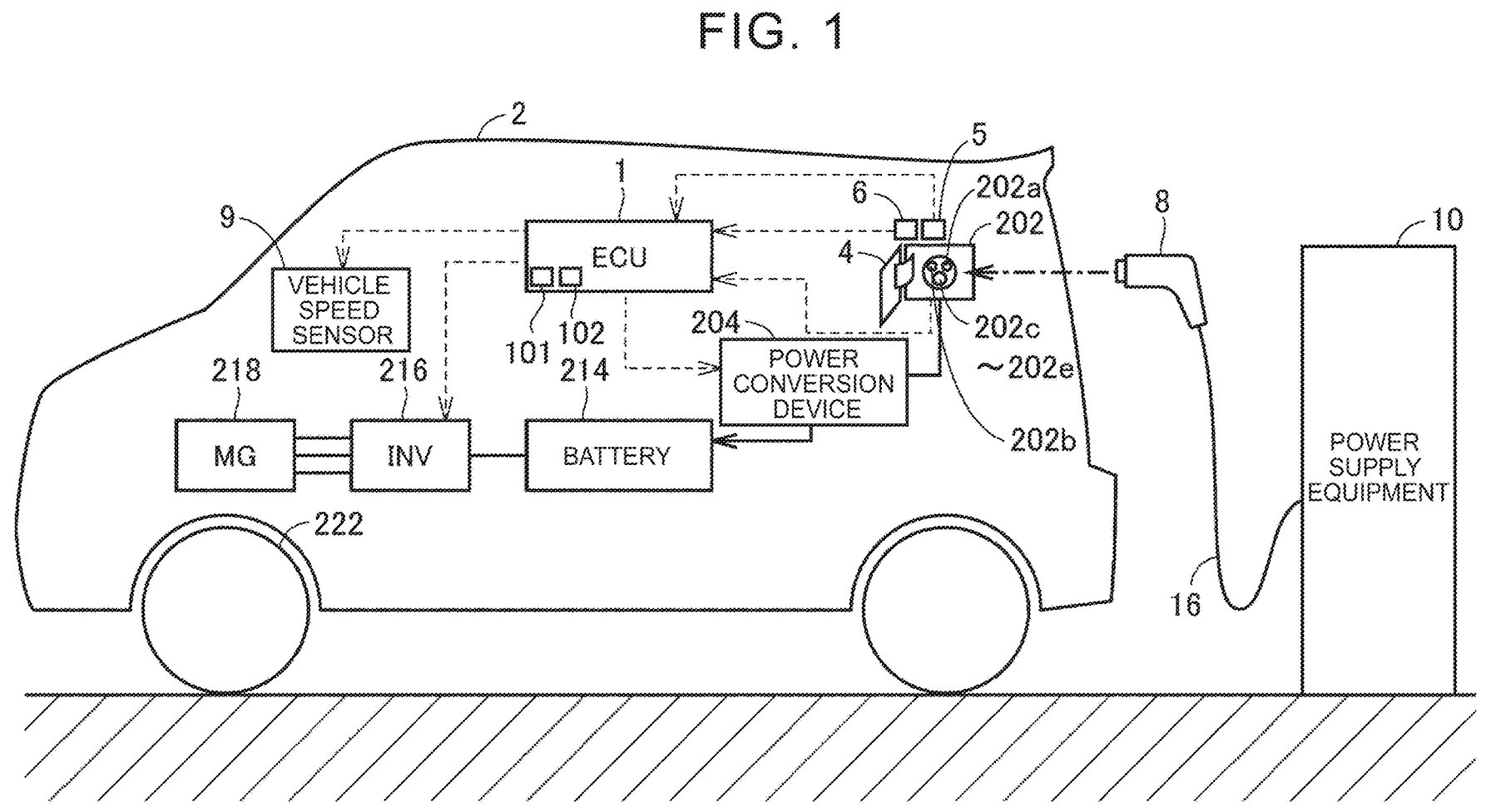

Hereinafter, a configuration of electrified vehicle (hereinafter, referred to as vehicles) 2 according to the present embodiment will be described. FIG. 1 is a diagram illustrating an example of a configuration of a vehicle 2. The vehicle 2 includes, for example, an electrified vehicle capable of exchanging electric power with an electric device outside the vehicle 2 such as a plug-in hybrid electric vehicle and a battery electric vehicle. In FIG. 1, for example, it is assumed that the vehicle 2 is parked in a parking space in which power supply equipment 10 is installed.

As illustrated in FIG. 1, the vehicle 2 includes an ECU (electronic control unit) 1, a vehicle speed sensor 9, an inlet 3, a power conversion device 204, a lid switch 5, a lock mechanism 6, a battery 214, an inverter 216, and a motor generator (MG) 218.

The motor generator 218 is constituted by, for example, one or more three-phase AC rotating electric machines. The motor generator 218 exchanges electric power with the inverter 216. For example, when the vehicle 2 is driven, the motor generator 218 applies a rotational force to the drive wheels 222 using electric power supplied from the inverter 216. The drive wheels 222 are rotated by a rotational force applied by the motor generator 218 to drive the vehicle 2.

The inverter 216 bidirectionally converts power between AC power of the motor generator 218 and DC power of the battery 214 in response to a control signal from an ECU 1. A converter for step-up and step-down may be provided between the inverter 216 and the battery 214.

The battery 214 is, for example, a power storage element (power storage device) configured to be rechargeable, and typically a secondary battery such as a nickel metal hydride battery or a lithium-ion battery having a solid or liquid electrolyte is used. Alternatively, a large-capacity capacitor may be used instead of the battery 214.

The battery 214 is externally charged using electric power supplied from the power supply equipment 10. The external charging includes AC charging in which the AC power supplied from the power supply equipment 10 that is external equipment of the vehicle 2, is converted into DC power by the power conversion device 204 and the battery 214 is charged.

The inlet 3 is provided on the exterior portion of the vehicle 2 together with the lid 4, and has a shape to which a connector 8 to be described later can be attached. The inlet 3 is configured to transmitting power to and from external equipment. The inlet 3 is provided with AC connecting portions 202a, 202b and 202e from the communication portion 202c.

When the connector 8 is attached to the inlet 3, AC connecting portion (see FIG. 2) of the connector 8 is electrically connected to AC connecting portion 202a, 202b of the inlet 3, and the communication portion of the connector 8 is connected to 202e from the communication portion 202c of the inlet 3.

The power conversion device 204 performs power conversion between the battery 214 and the inlet 3 in response to a control signal from the ECU 1.

The lid switch 5 outputs a signal indicating an open state to the ECU 1 when the lid is opened, and stops output of a signal indicating an open state when the lid is closed, or outputs a signal indicating a closed state to the ECU 1. The vehicle speed sensor 9 detects the speed of the vehicle 2 and outputs a signal indicating the detected speed of the vehicle 2 to the ECU 1.

The lock mechanism 6 restricts removal and attachment of the connector 8 to the inlet 3 using an actuator (not shown) or the like (lock state), or releases the restriction of attachment and detachment of the connector 8 (unlock state). The lock mechanism 6 switches from one of the lock state and the unlock state to the other state in response to a control signal from the ECU 1. The lock mechanism 6 is switched to an unlock state, for example, when the vehicle 2 is in a stopped state, and is switched to a lock state when the vehicle 2 is in a traveling state or when the connector 8 is attached to the inlet 3. The ECU 1 stores information about the state of the actuator (information such as a value indicating whether the lock mechanism 6 is in the lock state or the unlock state) in the memory.

The ECU 1 includes CPU (Central Processing Unit) 101 and memories (e.g., ROM (Read Only Memory), RAM (Random Access Memory), etc.) 102. Based on information such as maps and programs stored in the memory 102 and information from various sensors (e.g., the vehicle speed sensor 9 and the lid switch 5), the ECU 1 controls the respective devices (e.g., the lock mechanisms 6, etc.) so that the vehicle 2 is in a desired condition. Note that various kinds of control performed by the ECU 1 are not limited to processing by software, and dedicated hardware (electronic circuitry) can be constructed and processed. The history of the information acquired from the various sensors is stored in a storage device such as a memory.

Further, when the connector 8 is attached to the inlet 3, the ECU 1 executes a communication process of receiving predetermined data from the connector-side device (power supply equipment 10). The predetermined information includes, for example, information on power that can be exchanged between the power supply equipment 10 and the battery 214 (such as a connector connection signal PISW described later).

Hereinafter, with reference to FIG. 2, a circuit configuration of the power supply equipment 10 and the vehicle 2 will be described as an example in which the connector 8 is attached to the inlet 3. FIG. 2 is a diagram illustrating an example of a circuit configuration of the power supply equipment 10 and the vehicle 2.

The power supply equipment 10 includes a power supply relay K1, K2, a power supply control device 10a, and an oscillator 10b. When the power supply relay K1, K2 is open, the power supply path is interrupted. Further, when the power supply relay K1, K2 is in the closed state, electric power can be supplied from an AC power supply (not shown) of the power supply equipment 10 to the vehicles 2 via the connectors 8 and the inlets 3.

The oscillator 10b provides a pilot signal CPLT to the ECU 1 via the connector 8 and the inlet 3. The electric potential of the pilot signal CPLT is controlled by the ECU 1, and is used as a signal for remotely controlling the power supply relay K1, K2 from the ECU 1.

The power supply control device 10a controls the power supply relay K1, K2 based on the potential of the pilot signal CPLT. The pilot signal CPLT is used as a signal for notifying the ECU 1 of the rated current at the time of AC charge from the oscillator 10b.

The power supply control device 10a includes a CPU, a memory, and the like (neither of which is shown). The power supply control device 10a detects the potential of the oscillator 10b outputted from the oscillator 10b, and controls the operation of the oscillation circuit CPLT based on the detected potential of the pilot signal CPLT.

When the connector 8 is not connected to the inlet 3, the power supply control device 10a controls the operation of the oscillator 10b such that the battery is V0 (e.g., +12V) and the non-oscillating pilot signal CPLT is outputted.

When the connector 8 is connected to the inlet 3, the power supply control device 10a controls the operation of the oscillator 10b such that the pilot signal CPLT oscillating at a predetermined frequency and duty cycle is outputted.

When the upper limit of the potential of the pilot signal CPLT decreases to V2 (<V1), the power supply control device 10a controls the power supply relay K1, K2 so as to be closed. As a result, electric power from the AC power supply is supplied to the inlet 3 via the connector 8. The upper limit of the potential of the pilot signal CPLT is lowered to V2 when the switching S2 becomes conductive.

The connector 8 includes a resistor R4, RC and a switch S3. One end of the switch S3 is connected to the ground line L3. The other end of the switch S3 is connected to one end of the resistor RC. The resistor R4 is connected in parallel to the switch S3. The other end of the resistor RC is connected to the signal line L2. The signal line L2 is electrically connected to the communication unit 202d when the connector 8 is attached to the inlet 3.

The switch S3 operates in conjunction with a push button (not shown) provided in the connector 8. When the push button is not pressed, the switch S3 is closed. When the push button is pressed, the switch S3 is opened.

One end of the resistor R5 is connected to the communication unit 202d, and the other end of the resistor R5 is connected to the power supply Vsmp. The ECU 1 is configured to be capable of acquiring a potential between the resistor R5 and the communication unit 202d. The resistor RC,R4, R5, the switch S3, and the power supply Vsmp constitute a connection detection circuit for detecting a connection between the connector 8 and the inlet 3.

When the connector 8 is attached to the inlet 3, a signal having a potential (voltage) V3 determined by the voltage of the power supply Vsmp and the resistance of the resistor R5 is generated as a connector connecting signal PISW (hereinafter also simply referred to as "PISW") on the signal line L2. When the connector 8 is attached to the inlet 3 and the push button is in a non-operating state, a signal having a potential (voltage) V4 determined by the voltage of the power supply Vsmp and the resistor R5,RC is generated as a PISW on the signal line L2. When the push button is operated with the connector 8 attached to the inlet 3, a signal having a potential (voltage) V5 determined by the voltage of the power supply Vsmp and the resistor R4, R5, RC is generated as a PISW on the signal line L2.

Therefore, the ECU 1 can detect the connecting condition between the connector 8 and the inlet 3 by acquiring the potential (voltage) of PISW using a voltage sensor or the like.

When the connector 8 is not attached to the inlet 3, the potential of PISW is V3, and when the connector 8 is attached to the inlet 3, the potential of PISW is V4 or V5 depending on the operating condition of the push button.

That is, the ECU 1 can determine whether or not the connector 8 is attached to the inlet 3 depending on whether or not the potential of PISW is V3. However, in order to determine whether or not the potential of PISW is from V3 to V5, a constant range is set around each of the reference potentials V3, V4 and V5. A determination is made as to whether or not the connector 8 is attached to the inlet 3 depending on whether or not the potential is within any range.

In this case, the predetermined range is set by considering, for example, an error in resistance values of various resistors (for example, a resistor R4 and a resistor RC) provided in the connector 8, an error in resistance values of resistors (for example, a resistor R5) provided on the vehicle 2 side, a detection error on the vehicle 2 side, and the like. If the tolerance range of these errors is set to be wider in an attempt to ensure compatibility in the market (i.e., to be able to determine whether or not some connectors used in the market are attached), the range of the potential for determining the potential V3 is set to be wider, and if the range of the potential V4 or V5 is determined, it may be difficult to determine the attachment.

For example, it is assumed that the potential range for determining the potential V3 is set to allow an error of ±5% from the reference potential as the upper and lower limits according to a standard or the like for ensuring compatibility. At this time, when the sum of the error of the resistance value and the detection error exceeds ±5%, the state in which the connector is not attached may not be determined with high accuracy. This also applies when the potential V4 and the potential V5 are determined.

Therefore, in the present embodiment, in a condition in which the ECU 1 is not attached to the connector 8 to the inlet 3, an offset learning process is executed in which a correction value is calculated using a difference between a voltage (PISW potential) outputted from the connection detection circuit and a predetermined reference voltage (a voltage corresponding to a potential V3) serving as a reference. More specifically, the ECU 1 executes the offset learning process when the value indicated by the lid switch 5 changes from the value indicated by the lid 4 to the value indicated by the open state.

In this way, since the value indicated by PISW can be acquired with high accuracy by executing the offset learning process, the sum of the error of the resistive value and the detected error can be set within the potential for determining the potential V3 described above. Thus, it is possible to accurately determine whether or not the connector 8 is attached to the inlet 3.

Figure 3:
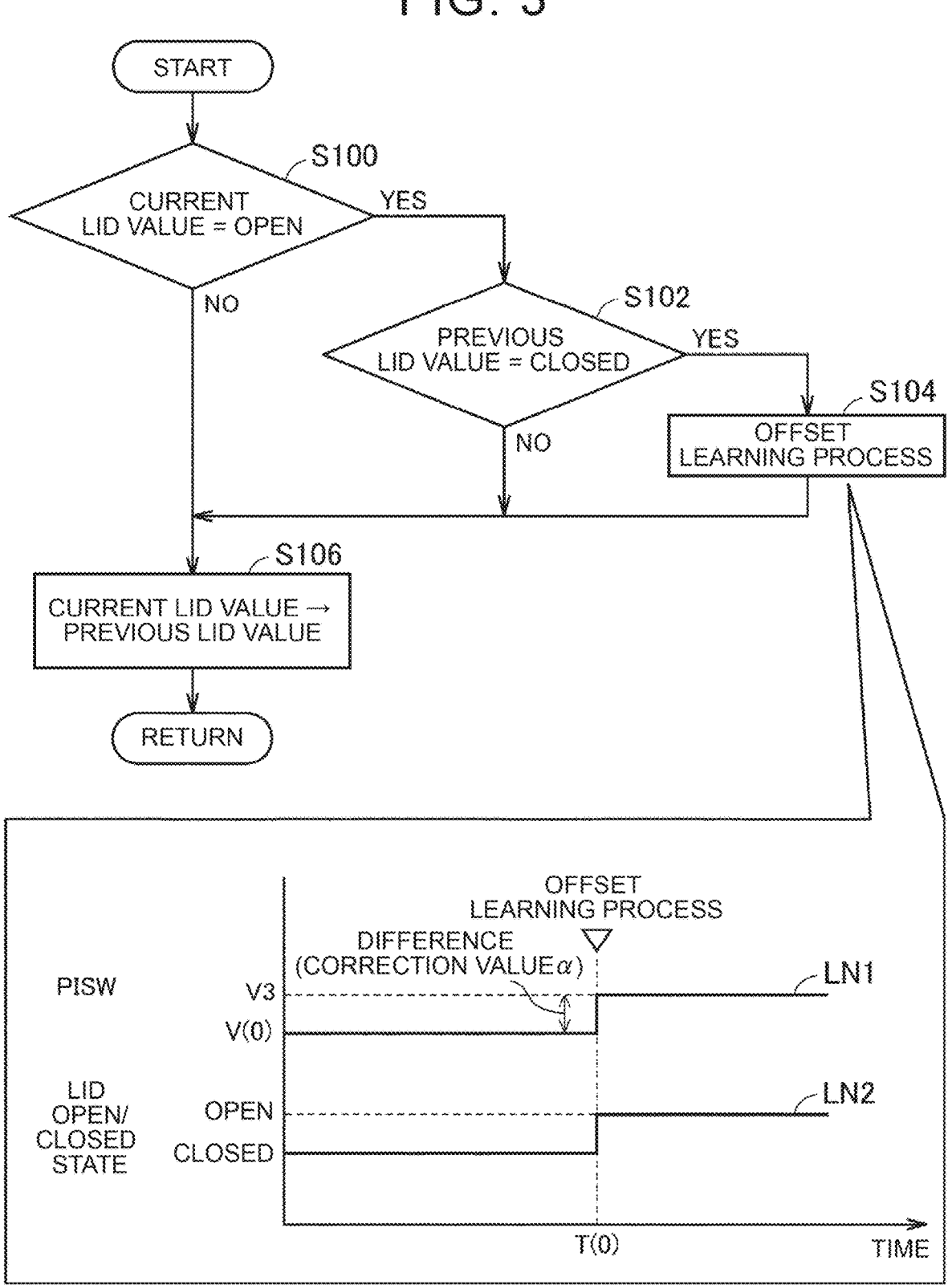
FIG. 3 is a diagram for explaining an operation of ECU.

Hereinafter, referring to FIG. 3, a process executed by the ECU 1 of the vehicle 2 according to the present embodiment will be described. FIG. 3 is a diagram for explaining an exemplary operation of the ECU 1.

In step (hereinafter, step is referred to as S) 100, the ECU 1 determines whether or not the current value of the voltage value outputted by the lid switch 5 (hereinafter, referred to as the current value of the lid switch 5) is a value indicating an open state. The lid switch 5 outputs, for example, a voltage value indicating an ON state when the lid 4 is in an open state, and outputs a voltage value indicating an OFF state when the lid 4 is in a closed state, or stops outputting a voltage value. When it is determined that the current value is a value indicating an open state (YES in S100), the process proceeds to S102.

In S102, the ECU 1 determines whether or not the previous value of the voltage value outputted by the lid switch 5 (hereinafter, referred to as the previous value of the lid switch 5) is a value indicating a closed state. The ECU 1 acquires the previous value from the memory and determines whether the acquired previous value is a value indicating a closed state. If it is determined that the previous value is a value indicating a closed state (YES in S102), the process proceeds to S104.

In S104, the ECU 1 performs an offset learning process. The ECU 1 detects the voltage of PISW and calculates a difference between the detected voltage and the reference voltage as a correction value (learned value) a. The process is then transferred to S106.

In S106, the ECU 1 sets the current value of the lid switch 5 as the previous value. Thereafter, the process ends. If it is determined that the current value is not a value indicating an open state (NO in S100), or if it is determined that the previous value is not a value indicating a closed state (NO in S102), the process proceeds to S106.

An exemplary operation of the ECU 1 based on the above configuration and flow chart will be described. In the balloon of FIG. 3, a timing chart is shown in which the horizontal axis represents time and the vertical axis represents various voltages. LN1 of FIG. 3 shows the variation of PISW. LN2 of FIG. 3 shows the variation of the voltage outputted by the lid switch 5.

When the connector 8 is not attached, PISW becomes V(0) as shown in LN1 of FIG. 3. It is assumed that the voltage V(0) is a voltage lower than the reference voltage (potential V3) due to an error in the resistance value, a detected error, or the like. When the operation of opening the lid 4 is not performed, the lid 4 is in the closed state. When the closed state of the lid 4 is maintained (NO in S100), the current value of the lid switch 5 and the previous value become the same state (S106).

On the other hand, at time T(0), when the user opens the lid 4 to attach the connector 8 to the inlet 3 and the lid 4 is opened, the voltage value of the lid switch 5 changes to a value indicating an open state (YES in S100). At this time, since the previous value is a value indicating a closed state (YES in S102), an offset learning process is executed (S104). When the offset learning process is executed, the correction value a is calculated from the difference between the detected value of the voltage of PISW and the reference voltage at time T(0). Then, the current value of the voltage value outputted by the lid switch 5 is set as the previous value (S106). After that, the ECU 1 acquires, as a PISW, a value obtained by adding the correction value a to the detected voltage. Consequently, as shown in LN1 of FIG. 3, PISW acquired by the ECU 1 matches the reference voltage.

As described above, according to electrified vehicle of the present embodiment, it is possible to accurately acquire the data indicated by PISW by executing the offset learning process. Therefore, the sum of the resistance value error and the detection error can be set within the potential for determining the potential V3. Therefore, it is possible to provide an electrified vehicle for accurately determining whether or not the connector is attached to the inlet.

Modification examples will be described below.

In the above embodiment, the offset learning is performed using the current value of PISW detected when the lid 4 changes from the open state to the closed state, but for example, the offset learning may be performed using the previous value of PISW.

Figure 4:
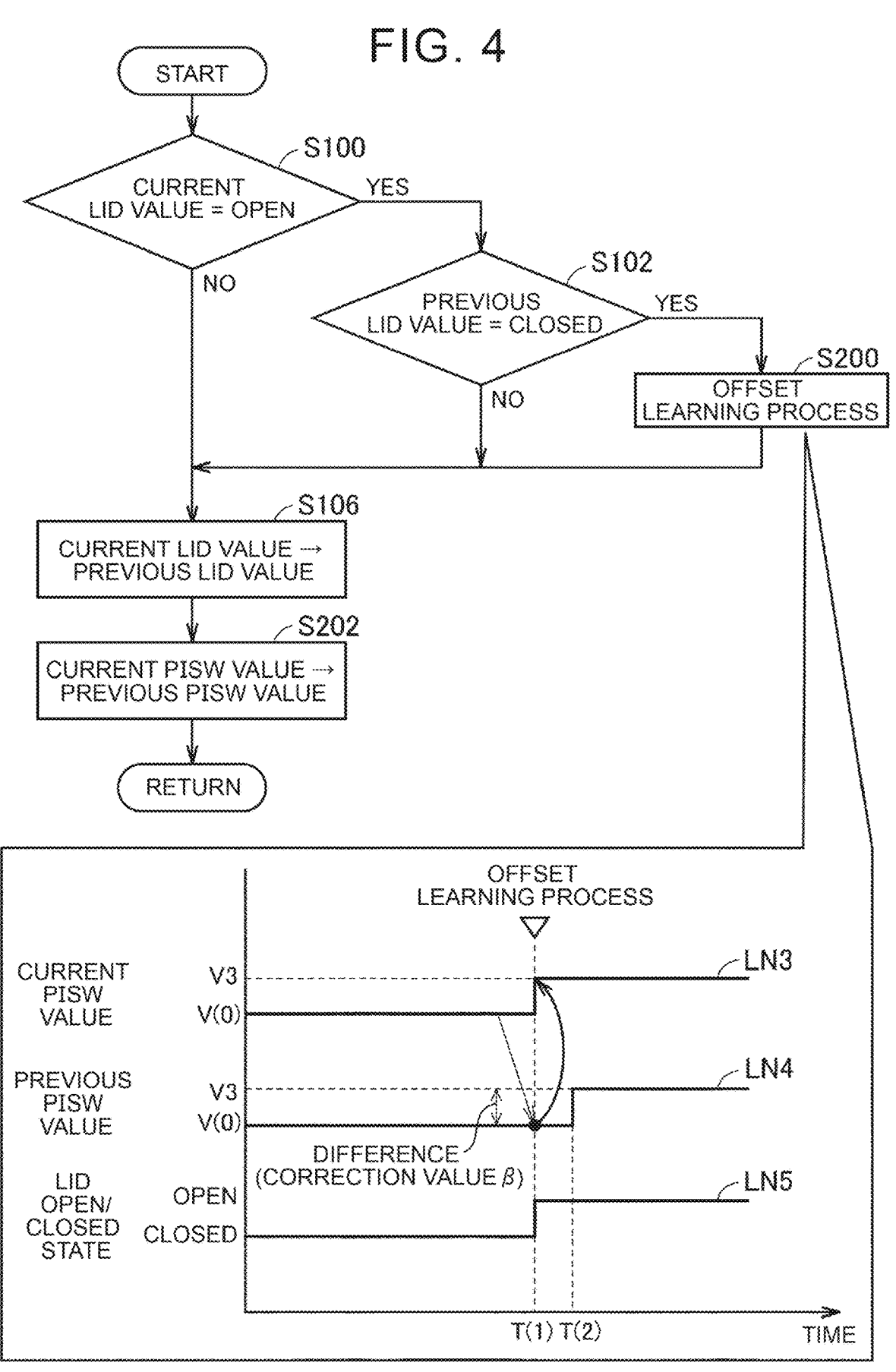
FIG. 4 is a diagram for describing an example of the operation of ECU in the modified example.

FIG. 4 is a diagram for describing an example of the operation of the ECU 1 in the modified example. Note that the processes of S100, S102 and S106 shown in the flowchart of FIG. 4 are the same as the processes of S100, S102 and S106 shown in the flowchart of FIG. 3 except for the cases described below. Therefore, the detailed description thereof will not be repeated.

When it is determined that the previous value of the lid switch 5 is a value indicating a closed state (YES in S102), the process proceeds to S200.

In S200, the ECU 1 performs offset learning. More specifically, the ECU 1, for example, acquires the previous value of the detected value of PISW in a state where the connector 8 is not attached, to calculate the difference between the reference voltage corresponding to the state of not attached (potential V3). The ECU 1 calculates a correction value using the calculated difference. The ECU 1 calculates the correction value such that the sum of the previous value and the correction value becomes the reference voltage. The ECU 1 calculates a value obtained by subtracting the previous value from the reference voltage as a correction value (learned value). Further, the ECU 1 adds the correction value to the detected value of PISW to obtain the current value of PISW. The process is then transferred to a S106. S106 is processed and then transferred to S202.

In S202, the ECU 1 sets the current value of PISW as the previous value of PISW. The process is then terminated.

Figure 6:
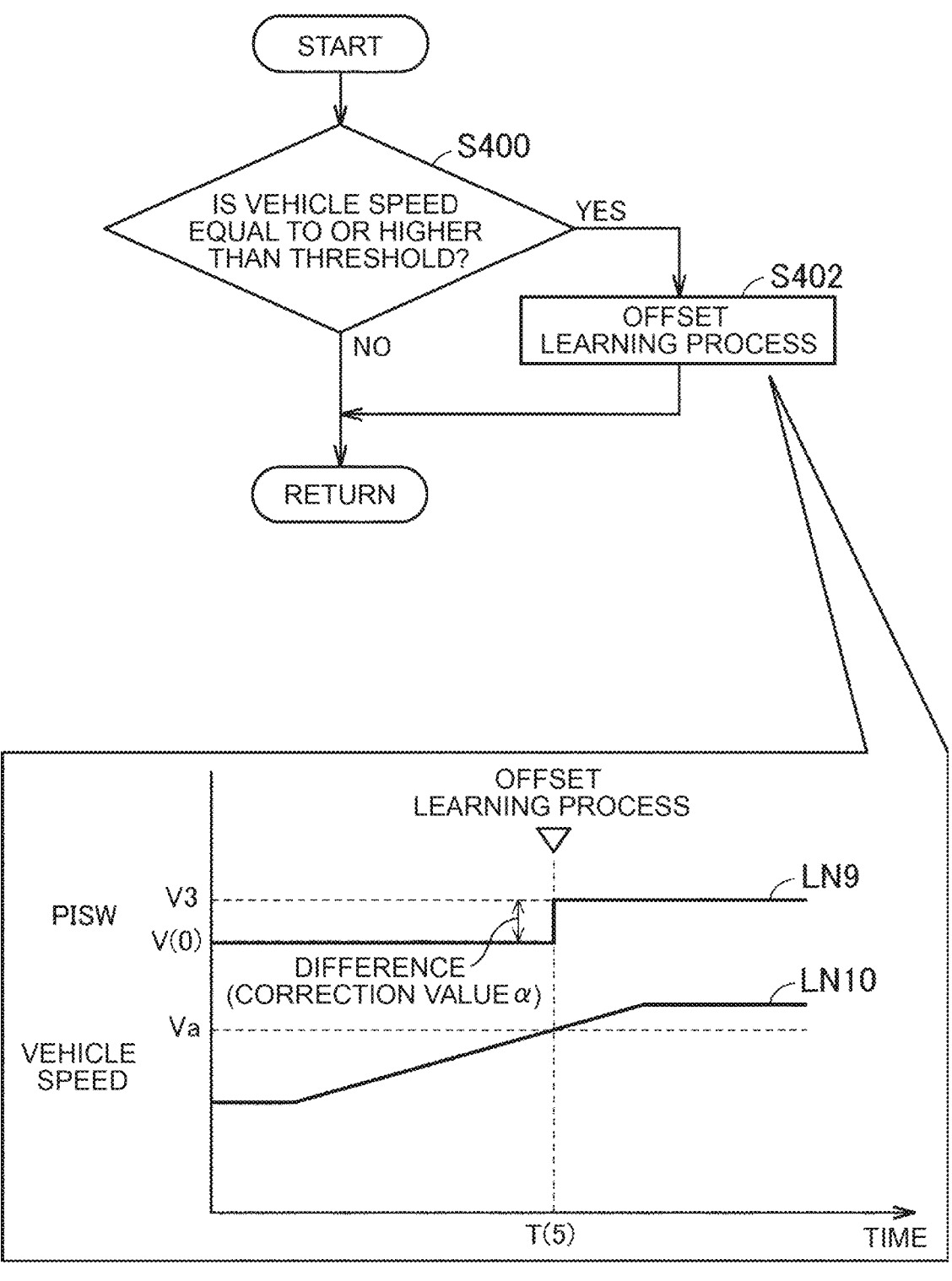
FIG. 6 is a diagram for explaining still another example of the operation of ECU in the modified example.

An example of the operation of the ECU 1 in the modified example based on the flow chart as described above will be described. In the balloon of FIG. 4, a timing chart is shown in which the horizontal axis represents time and the vertical axis represents various voltages. LN3 in FIG. 4 shows the change in the current PISW. LN4 in FIG. 6 shows the change in the previous value of PISW. LN5 of FIG. 6 shows a change in the state of the lid switch 5 (the open/close state of the lid).

When the connector 8 is not attached, the voltage V(0) is obtained as shown in LN3 and LN4 of FIG. 6. When the operation of opening the lid 4 is not performed, the lid 4 is in the closed state. When the closed state of the lid 4 is maintained (NO in S100), the current value and the previous value of the lid switch 5 become the same value (S106), and the current value and the previous value of PISW become the same value (S202).

On the other hand, at time T(1), when the user opens the lid 4 to open the lid 4, the voltage value of the lid switch 5 changes to a value indicating an open state (YES in S100). At this time, since the previous value is a value indicating a closed state (YES in S102), an offset learning process is executed (S200). When the offset learning process is executed, the correction value R is calculated from the difference between the previous value of PISW and the reference voltage (potential V3) at time T(1). Then, the current value of the lid switch 5 is set as the previous value (S106). Thereafter, the ECU 1 acquires a value obtained by adding the correction value R to the detected value of PISW as the current value of PISW. As a consequence, as shown in LN3 of FIG. 6, the potential of PISW changes to the corrected value at time T(1). Since the current value of PISW is set as the previous value (S202), as shown in LN4 of FIG. 6, the previous value at the time T(2) is changed to the corrected value (reference voltage) at the time of the next computation.

In this way, it is possible to accurately determine whether or not the connector 8 is connected even when the current value of PISW changes immediately from the potential of the connector 8 is not connected, such as when the connector 8 is connected immediately after the lid 4 is opened.

Figure 5:
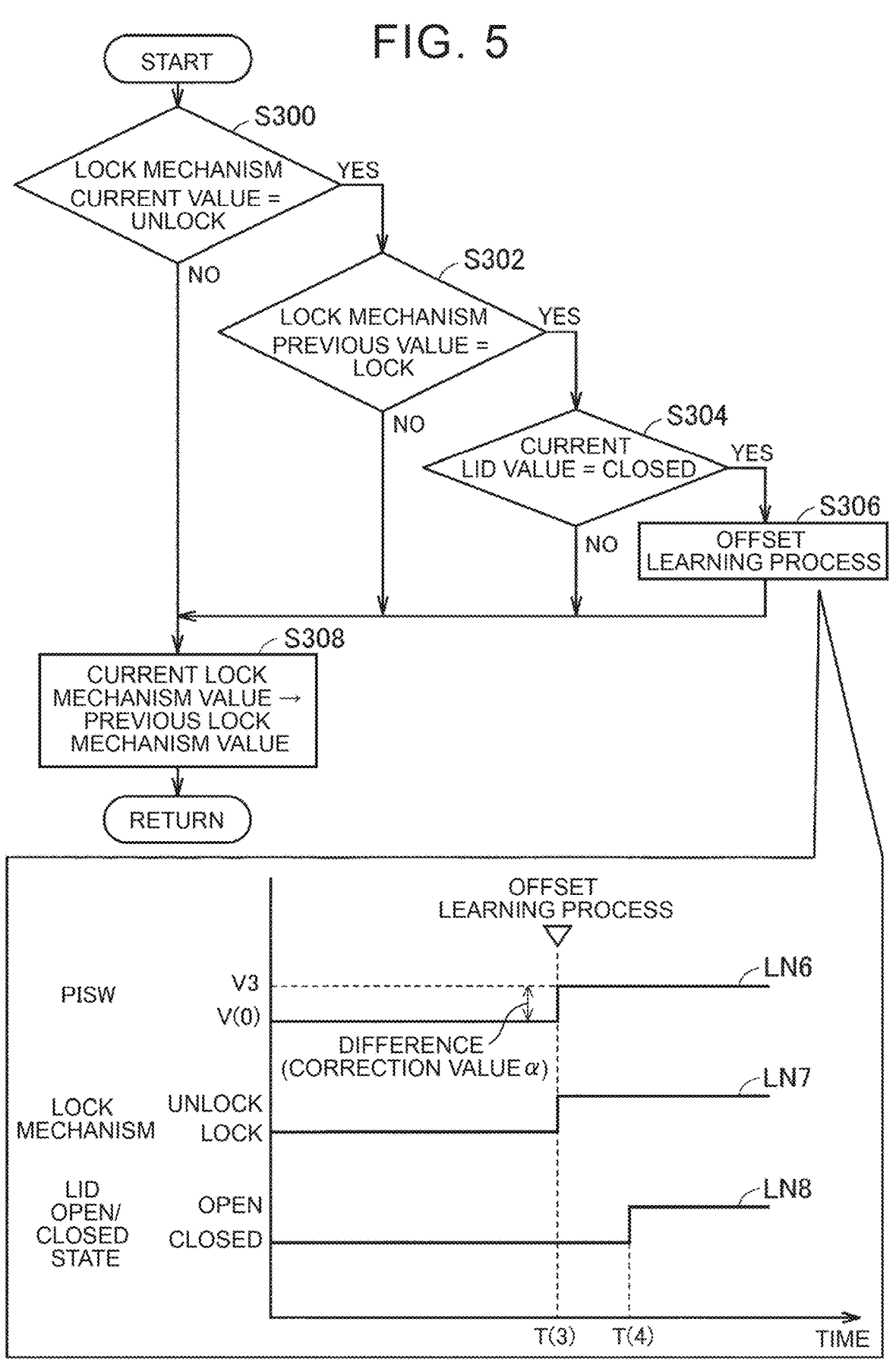
FIG. 5 is a diagram for describing another example of the operation of ECU in the modification.

Further, in the above embodiment, it has been described that whether or not to execute the offset learning process using the open/close state of the lid 4 is determined. However, for example, it may be determined whether or not to execute the offset learning process using the state of the lock mechanism 6 in addition to the open/close state of the lid 4. FIG. 5 is a diagram for explaining another example of the operation of the ECU 1 in the modified example.

In S300, the ECU 1 determines whether or not the current value of the value indicating the state of the lock mechanism 6 (hereinafter, referred to as the current value of the lock mechanism 6) is a value indicating the unlock state. When it is determined that the current value of the lock mechanism 6 is a value indicating the unlock state (YES in S300), the process proceeds to S302.

In S302, the ECU 1 determines whether or not the present value of the lock mechanism 6 is a value indicating a lock state. When it is determined that the current value of the lock mechanism 6 is a value indicating a lock state (YES in S302), the process proceeds to S304.

In S304, the ECU 1 determines whether or not the current value of the lid switch 5 is a value indicating a closed state. It is determined whether or not the present value of the lid switch 5 is a value indicating a closed state. When it is determined that the current value of the lid switch 5 is a value indicating a closed state (YES in S304), the process proceeds to S306.

In S306, the ECU 1 performs an offset learning process. The offset learning process is the same as the process of S106 of FIG. 3. The process is then transferred to a S308.

In S308, the ECU 1 sets the current value of the lock mechanism 6 as the previous value. The process is then terminated. When it is determined that the current value of the lock mechanism 6 is not a value indicating an unlock state (NO in S300), when it is determined that the previous value of the lock mechanism 6 is not a value indicating a lock state (NO in S302), or when it is determined that the current value of the lid switch 5 is not a value indicating an open state (NO in S304), the process proceeds to S308.

Another example of the operation of the ECU 1 in the modified example based on the flow chart as described above will be described. In the balloon of FIG. 5, a timing chart is shown in which the horizontal axis represents time and the vertical axis represents various voltages. LN6 in FIG. 5 shows the change in PISW. LN7 of FIG. 5 shows a change in the condition of the lock mechanism 6. LN8 of FIG. 5 shows a change in the state of the lid switch 5 (the open/closed state of the lid 4).

When the connector 8 is not attached, the voltage V(0) is obtained as shown in LN6 of FIG. 5. When the lid 4 is not opened, the closed state of the lid 4 is maintained (NO in S300), and since the lock mechanism 6 is also in the lock state (NO in S300), the current value of the lock mechanism 6 becomes the same value as the previous value (S308).

On the other hand, at time T(3), the lock mechanism 6 is switched to the unlock state, the current value of the lock mechanism 6 becomes a value indicating the unlock state (YES in S300), and the previous value becomes a value indicating the lock state (YES in S302). Since the open/close state of the lid 4 becomes a closed state (YES in S304), an offset learning process is executed (S306). When the offset learning process is executed, the correction value a is calculated from the difference between the detected value of PISW and the reference voltage at time T(3). Thereafter, when acquiring the value of PISW, the ECU 1 acquires the value obtained by adding the correction value a to the detected value of PISW as the current value of PISW. Consequently, as shown in LN6 of FIG. 5, PISW obtained by the ECU 1 matches the reference voltage. Thereafter, the current value of the lock mechanism 6 is set as the previous value (S308). At time T(4), when the lid 4 is in the open state, the value indicating the open/close state of the lid switch 5 changes to the value indicating the open state, as shown in LN8 of FIG. 5.

In this way, when the lock mechanism 6 changes from the lock state to the unlock state, the connector 8 is not plugged in the inlet 3, and thus PISW can be accurately acquired by executing the offset learning process.

Further, in the above embodiment, it has been described that whether or not to execute the offset learning process using the open/close state of the lid 4 is determined. However, for example, the speed of the vehicle 2 may be used to predict the opening/closing state of the lid 4 and determine whether or not to execute the offset learning process. FIG. 6 is a diagram for explaining still another example of the operation of the ECU 1 in the modified example.

In S400, the ECU 1 determines whether or not the vehicle speed is equal to or higher than the threshold Va. The threshold Va is, for example, a value for determining whether or not the vehicle 2 is traveling, and is a predetermined value. The threshold Va may be a lower limit value of a velocity range in which the vehicle 2 can be determined to be traveling with high accuracy in order to prevent or reduce erroneous determination. If it is determined that the vehicle speed is equal to or higher than the threshold Va (YES in S400), the process proceeds to S402.

In S400, the ECU 1 performs an offset learning process. The offset learning process is the same as the process described in S106 process of FIG. 3 in the above embodiment. The process is then terminated. When it is determined that the vehicle speed is lower than the threshold (NO in S400), this process is ended.

A further example of the operation of the ECU 1 in the modification example based on the flow chart as described above will be described. In the blowout of FIG. 6, a timing chart is shown in which the horizontal axis represents time and the vertical axis represents voltage and vehicle speed. LN9 in FIG. 6 shows the change in PISW. LN10 of FIG. 6 shows a change in vehicle speed. When the connector 8 is not attached, the voltage V(0) is obtained as shown in LN9 of FIG. 6. When the operation of opening the lid 4 is not performed, the closed state of the lid 4 is maintained. When the vehicle speed is lower than the threshold Va (NO in S400), the offset learning process is not executed.

On the other hand, when the vehicle speed increases and becomes equal to or higher than the threshold Va at time T(5) (YES at S400), the offset learning process is executed (S402). When the offset learning process is executed, the correction value a is calculated from the difference between the detected value of PISW and the reference voltage at time T(5). Thereafter, when acquiring the value of PISW, the ECU 1 acquires the value obtained by adding the correction value a to the detected value of PISW as the current value of PISW. Consequently, as shown in LN9 of FIG. 6, PISW obtained by the ECU 1 matches the reference voltage.

In this way, PISW can be acquired with high accuracy since the offset learning process is executed when the connector 8 having the vehicle speed equal to or higher than the threshold Va is not attached.

All or some of the above modifications may be combined for implementation.

It should be considered that the embodiments disclosed above are for illustrative purposes only and are not limitative of the disclosure in any aspect. The scope of the disclosure is represented by the appended claims, not by the above description, and includes all modifications within the meanings and scope equivalent to the claims.

What is claimed is:

1. An electrified vehicle, comprising:

an inlet covered by a lid, the inlet having such a shape that a connector of external equipment is attachable to the inlet;

a first detection circuit that detects an open state of the lid and detects a closed state of the lid;

a second detection circuit that outputs a voltage indicating whether the connector is attached to the inlet; and a control device configured to perform an offset learning process when the connector is not attached to the inlet, the offset learning process being a process of calculating a correction value using a difference between the voltage output from the second detection circuit and a predetermined voltage, wherein:

the control device performs the offset learning process after making a determination that the lid changed from the closed state to the open state.

2. The electrified vehicle according to claim 1, wherein after the determination that the lid changed from the closed state to the open state, the control device performs the offset learning process using a most recent detection result from the second detection circuit before the lid changed to the open state.

3. An electrified vehicle, comprising:

an inlet covered by a lid, the inlet having such a shape that a connector of external equipment is attachable to the inlet;

a first detection circuit that detects an open state of the lid and detects a closed state of the lid;

a second detection circuit that outputs a voltage indicating whether the connector is attached to the inlet; and a control device configured to perform an offset learning process when the connector is not attached to the inlet, the offset learning process being a process of calculating a correction value using a difference between the voltage output from the second detection circuit and a predetermined voltage, wherein:

a lock mechanism that is controlled by the control device to allow the connector to be locked in the inlet, and the control device is configured to perform the offset learning process after making a determination that the lid is in the closed state and after making a determination that the lock mechanism has switched from a locked state to an unlocked state.

4. An electrified vehicle, comprising:

an inlet having such a shape that a connector of external equipment is attachable to the inlet;

a first detection circuit configured to determine a speed of the electrified vehicle;

a second detection circuit configured to output a voltage indicating whether the connector is attached to the inlet; and a control device configured to perform an offset learning process after making a determination the connector is not attached to the inlet, wherein:

the offset learning process is a process of calculating a correction value using a difference between the voltage output from the second detection circuit and a predetermined voltage, and the control device is configured to make the determination that the connector is not attached to the inlet based on making a determination that the speed of the electrified vehicle is equal to or greater than a threshold.

\*   \*   \*   \*   \*